(12) United States Patent
Keating

(10) Patent No.: US 7,677,377 B2
(45) Date of Patent: Mar. 16, 2010

(54) MULTIMEMBERED CORE PLATE

(75) Inventor: Martin P. Keating, Plainfield, IL (US)

(73) Assignee: BorgWarner Inc., Auburn Hills, MI (US)

( * ) Notice: Subject to any disclaimer, the term of this patent is extended or adjusted under 35 U.S.C. 154(b) by 612 days.

(21) Appl. No.: 11/543,471

(22) Filed: Oct. 5, 2006

(65) Prior Publication Data
US 2007/0080042 A1 Apr. 12, 2007

Related U.S. Application Data

(60) Provisional application No. 60/724,546, filed on Oct. 6, 2005.

(51) Int. Cl.
*F16D 13/64* (2006.01)
(52) U.S. Cl. .................................. 192/107 R; 29/557
(58) Field of Classification Search ........................ None
See application file for complete search history.

(56) References Cited

U.S. PATENT DOCUMENTS

| | | | |
|---|---|---|---|
| 3,804,213 A | 4/1974 | Lucien et al. | |
| 4,674,616 A | 6/1987 | Mannino, Jr. | |
| 4,918,962 A | 4/1990 | Fritzsche | |
| 5,831,366 A | 11/1998 | Kern et al. | |
| 6,601,684 B2 | 8/2003 | Collins et al. | |
| 6,668,891 B2 | 12/2003 | Collins | |
| 2003/0047285 A1 | 3/2003 | Collis | |
| 2003/0047411 A1 | 3/2003 | Collis et al. | |
| 2005/0066507 A1 | 3/2005 | Terpstra | |
| 2005/0071976 A1 | 4/2005 | Terpstra | |

FOREIGN PATENT DOCUMENTS

| | | |
|---|---|---|
| EP | 0 115 211 A2 | 8/1984 |
| GB | 931 031 A | 7/1963 |
| GB | 1347240 | 2/1974 |
| JP | 4178223 | 6/1992 |

*Primary Examiner*—Rodney H Bonck
*Assistant Examiner*—Edwin A. Young
(74) *Attorney, Agent, or Firm*—Warn Partners, P.C.

(57) ABSTRACT

A core plate is provided including a plurality of stamped metal semi-trapezoidal members formed from a linear portion of planar stock material. Each member has teeth along a common edge and is connected to an adjoining member by an integral cord. The members are wound into a closed ring.

20 Claims, 4 Drawing Sheets

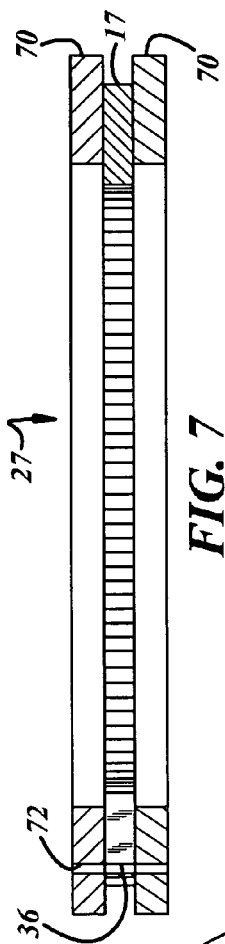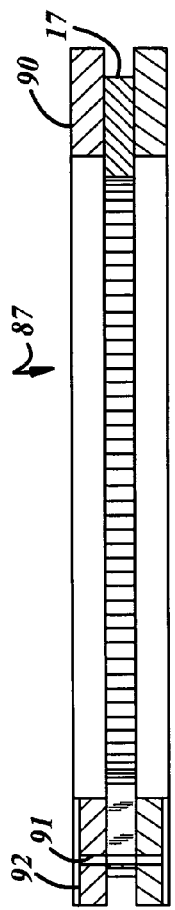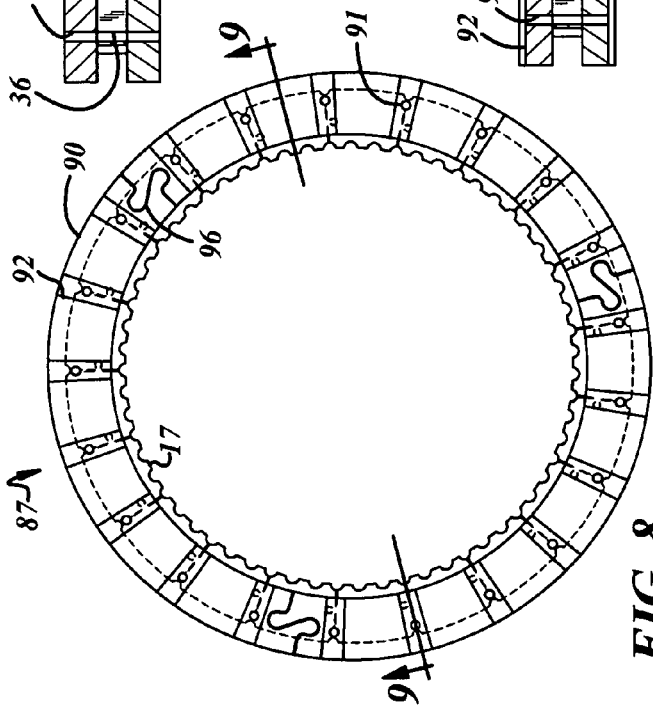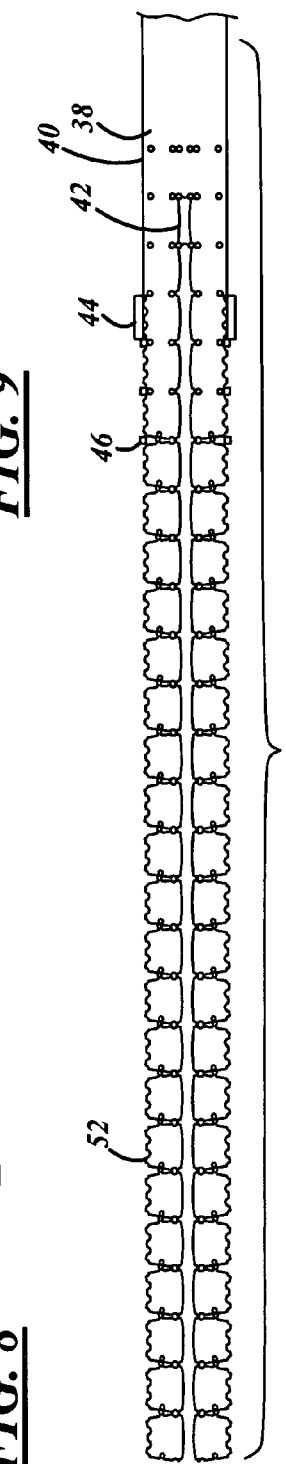

MULTIMEMBERED CORE PLATE

CROSS-REFERENCE TO RELATED APPLICATIONS

The present invention claims the benefit of U.S. Provisional Application No. 60/724,546 filed Oct. 6, 2005.

FIELD OF THE INVENTION

The present invention relates to core plates used for friction plates (sometimes referred to as friction discs) or separator plates for automotive vehicle transmissions.

BACKGROUND OF THE INVENTION

Friction packs in automotive vehicle transmissions typically have a combination of friction plates and separator plates. In many applications the friction plates are flat metal annular members (referred to as a core plate) covered over on both sides by friction facings. The separator plates are generally flat metal annular members with or without a friction facing. Most core plates for friction plates and separator plates are stamped from flat feedstock material. The stamping operation provides a high scrap rate for a relatively expensive steel material.

SUMMARY OF THE INVENTION

The present invention provides a core plate for a friction plate or separator plate with much lower scrap rates by providing a core plate that includes a plurality of stamped metal semi-trapezoidal members formed from a linear portion of planar stock material. Each member has teeth along a common edge and is connected to an adjoining member by an integral cord. The members are wound into a closed ring.

Other features of the invention will become more apparent to those skilled in the art as the invention is further revealed in the accompanying drawings and Detailed Description of the Invention.

BRIEF DESCRIPTION OF THE DRAWINGS

FIG. 7 is a view taken along line 7-7 of FIG. 6.

FIG. 8 is a front view of another friction plate utilizing a core plate of the present invention.

FIG. 9 is a view taken along line 9-9 of FIG. 8.

FIG. 10 is a schematic view of the stamping operation utilized to fabricate the core plate of FIG. 4.

DETAILED DESCRIPTION OF THE INVENTION

Figure 1:
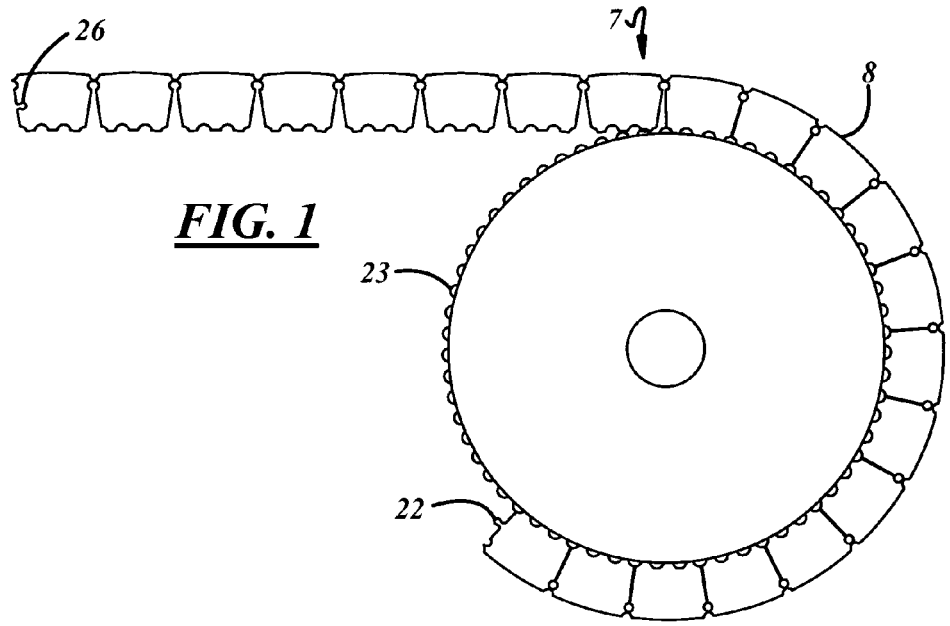
FIG. 1 is a schematic view of a core plate of the present invention being wound about a mandrel.
Figure 2:
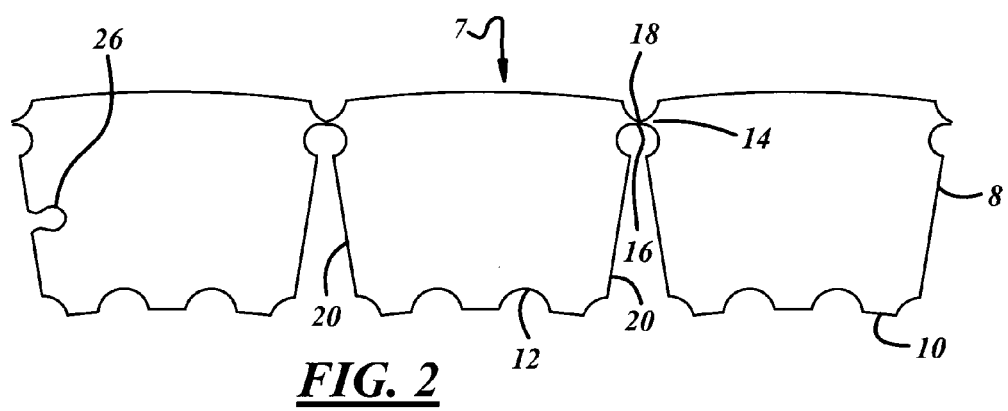
FIG. 2 is a partial enlarged view of a portion of the core plate shown in FIG. 1 in an unwound position.
Figure 3A:
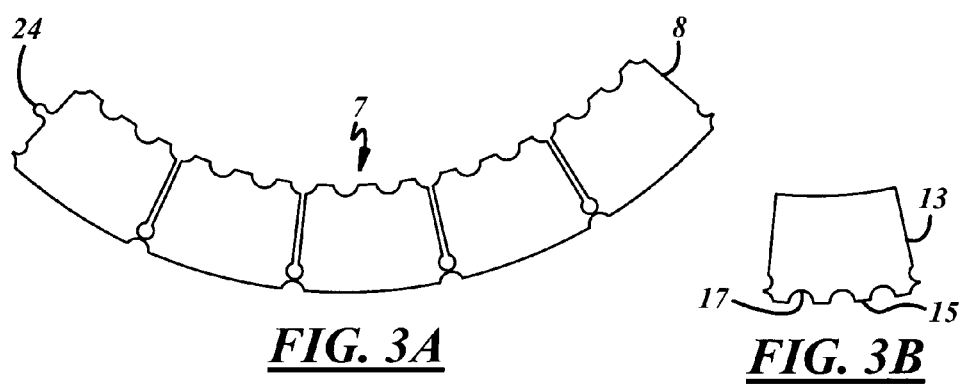
FIG. 3A is a view similar to FIG. 2 of a portion of the core plate that is wound.
Figure 3B:
FIG. 3B is a view similar to FIG. 3A wherein the core plate has gear teeth along its outer radial edge.

FIG. 1 schematically illustrates the formation of the core plate 7 of the present invention. Referring additionally to FIGS. 2, 3A the core plate 7 is fabricated from a plurality (typically five or more) members or segments 8. The segments 8 are stamped metal semi-trapezoidal members that are formed from a linear portion of planar stock material. Each segment 8 has at least one and preferably a plurality of teeth 10 along a common inner radial edge 12. In an alternative embodiment of FIG. 3B, the segments 13 have a plurality of teeth 15 along a common outer radial edge 17. An integral deformable cord 14 connects the segments 8 to each other. The cord 14 preferably has opposed radial inner and outer concave sides 16 and 18. After the core plate 7 is wound (FIGS. 1 and 3A), the radial inner side 16 will be in compression and the radial outer side 18 will be in tension.

The segments 8 have lateral sides 20 that are abutting (segments 8 are shown with a gap in FIG. 3 for purposes of illustration). The sides 20 can be connected to one another by welding, braising, riveting (FIG. 12), interlocking, adhesives, or other suitable methods. In manufacturing the core plate 7 is wrapped around a circular mandrel 23. An extreme end segment has a tongue 24 that fits within a groove 26 provided by the other extreme end segment. The tongue 24 combines with the groove 26 to provide a tongue and groove connection. The tongue and groove connection can be further enhanced by interference fit between the tongue 24 and the groove 26. The connection between the two ends segments can be further enhanced by the connective methods previously described.

Figure 4:
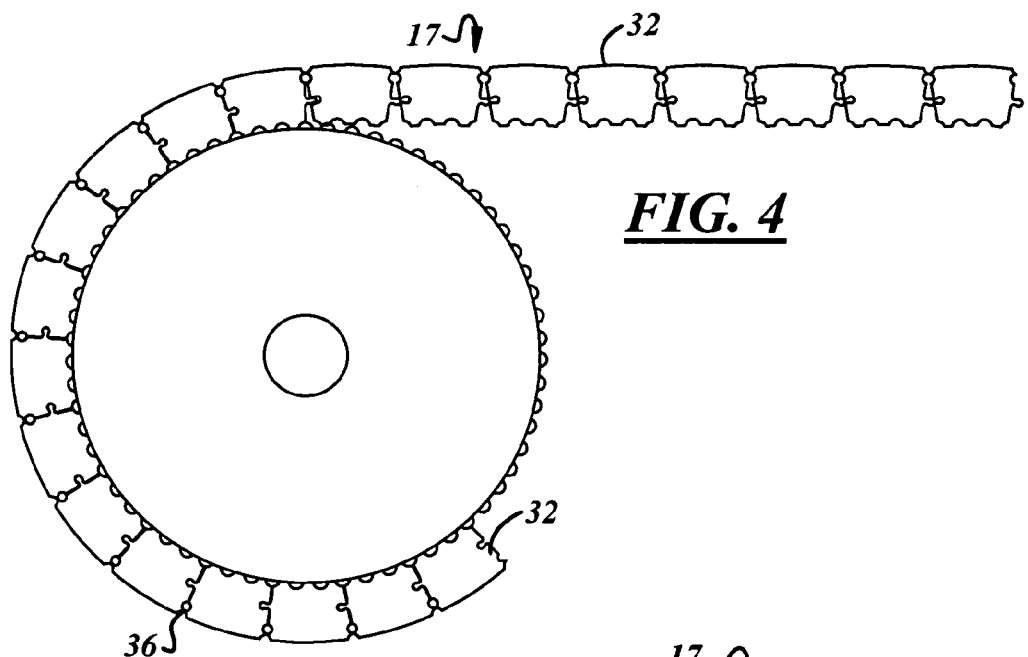
FIG. 4 is a view similar to that of FIG. 1 of an alternate preferred embodiment core plate of the present invention.
Figure 5:
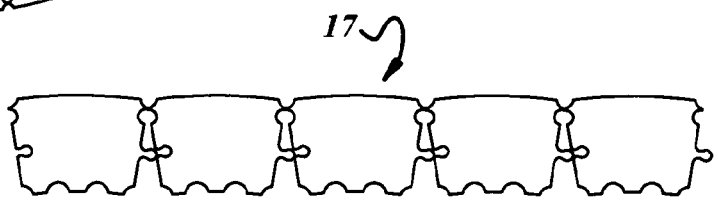
FIG. 5 as a partial view of a portion of the core plate shown in FIG. 4 in an unwound positioned.

FIGS. 4 and 5 provide a core plate 17. The core plate 17 has a tongue and groove connection between a majority of the segments 32. Core plate 17 also has oil holes 36 formed by a side 16 of the cord.

Figure 11:
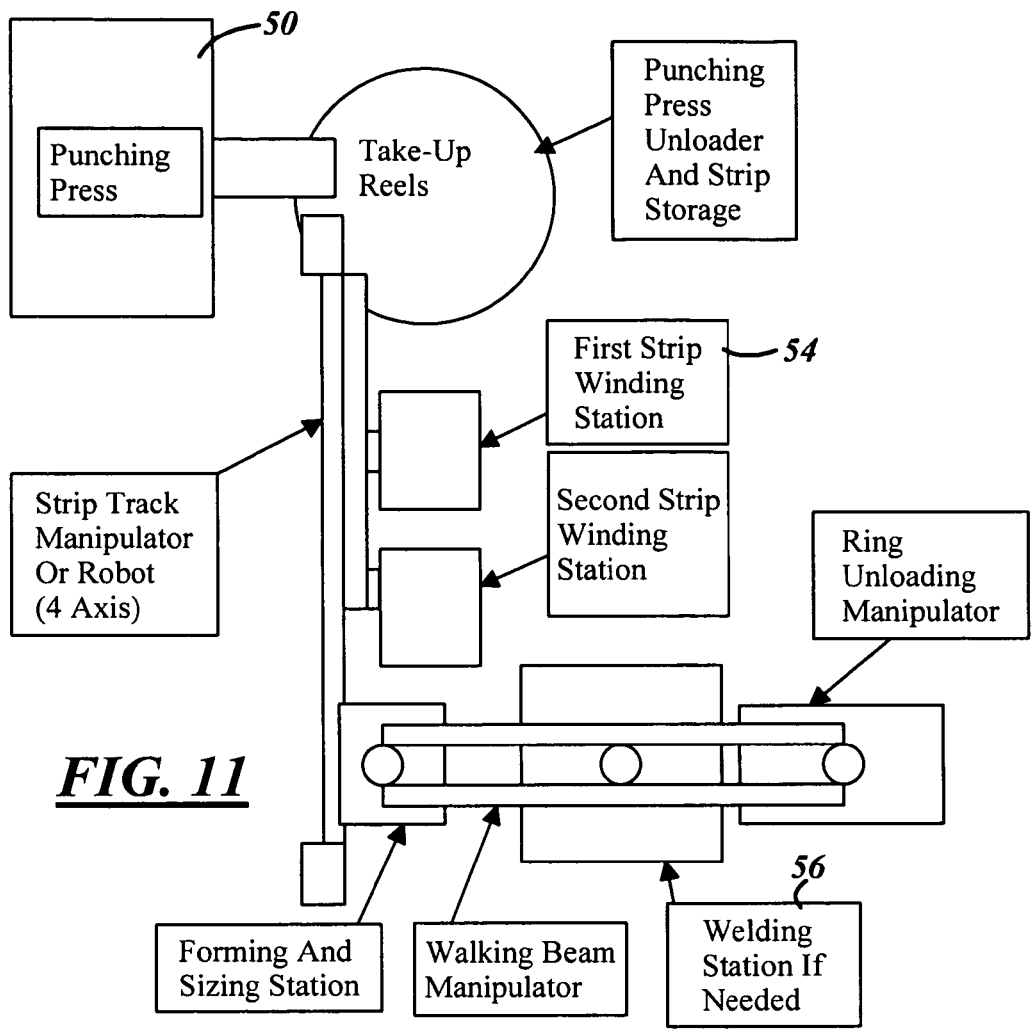
FIG. 11 is a schematic diagram of a manufacturing station to fabricate the core plate of the present invention.

Referring to FIGS. 10 and 11, two core plates 17 are formed from a linear portion of a planar stock material 38. A series of pilot stampings 40 are made. Next, a core plate separation operation 42 is performed. A teeth stamping operation 44 is then performed. A segment separation operation 46 is then performed. A cut off operation (not shown) is made with a sufficient number of segments 32 have been stamped. The above noted operations are completed on a punch press or presses 50. The punched strip 52 is delivered to one of the winding stations 54. The wound core plate 17 is then delivered to the welding station 56 to connect the segments 32 (in the example shown) by welding.

Figure 6:
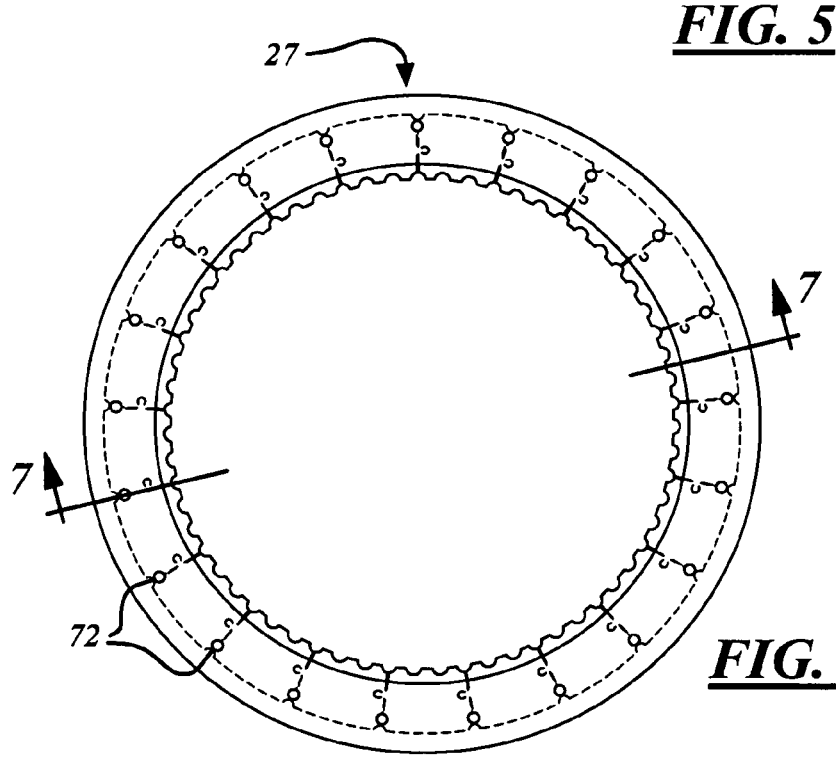
FIG. 6 is a front view of a friction plate utilizing a core plate of the present invention.

Referring to FIGS. 6 and 7, the core plate 17 is connected with friction full ring facing 70 to form a friction plate 27. The friction facing 70 has an oil holes 72 aligned with oil holes 36 of the core plate 17. The facing 70 promotes additional lateral stability for the core plate 17.

Referring to FIGS. 8 and 9, the core plate 17 is connected with segmented friction facings 90 to form a friction plate 87. The facings 90 have oil holes 91 and grooves 92 aligned with the oil holes 36 of the core plate. A tongue and groove shaped gap 96 between the facing segments allows passage of oil between the radial inner and outer sides of the friction plate 87. In another embodiment (not shown), the gap 96 can be aligned with the oil hole 36. Two of the facing segments 90 overlap a common core plate segment 32 to provide additional lateral stability to the core plate 17.

Figure 12:
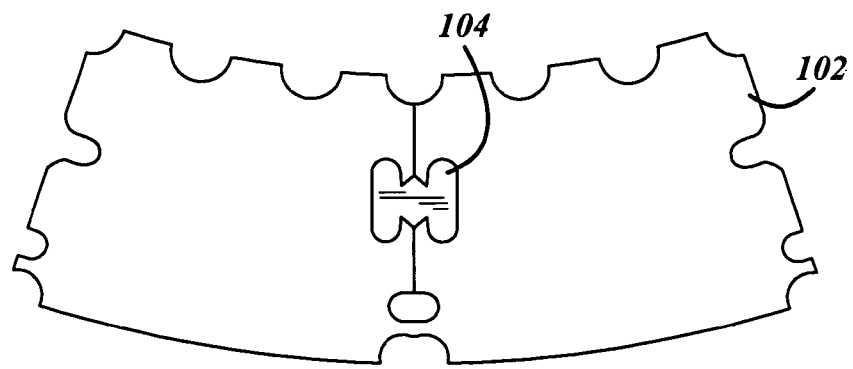
FIG. 12 is a view of a portion of a core plate of the present invention wherein the segments are riveted together.

FIG. 12 illustrates an embodiment wherein two segments 102 of the core plate that are joined by a rivet 104.

While preferred embodiments of the present invention have been disclosed, it is to be understood it has been described by way of example only, and various modifications can be made without departing from the spirit and scope of the invention as it is encompassed in the following claims.

What is claimed is:

1. A friction core plate for an automotive transmission comprising:
 a plurality of stamped metal semi-trapezoidal members formed from a linear portion of planar stock material, each member having teeth along a common edge, said members being connected to one another by an integral deformable cord, said members being wound into a closed ring and having lateral sides connected with one another.

2. A friction core plate as described claim 1 wherein said core plate forms a portion of a separator plate.

3. A friction core plate as described claim 1 wherein said core plate forms a portion of a friction plate.

4. A friction core plate as described claim 1 wherein said teeth are along a radial inside edge.

5. A friction core plate as described claim 1 wherein said teeth are along a radial outside edge.

6. A friction core plate as described claim 1 wherein there is a tongue and groove connection between at least two of said members.

7. A friction core plate as described claim 6 wherein there is interference in said tongue and groove connection.

8. A friction core plate as described claim 1 wherein there is a tongue and groove connection between a majority of said members.

9. A friction core plate as described in claim 1 wherein said cord has opposed radial inner and outer concave sides.

10. A friction core plate as described in claim 1 wherein a side of said cord forms an oil hole.

11. A friction core plate as described claim 1 wherein said cord has a radial inner side in compression and a radial outer side in tension.

12. A friction plate for an automotive transmission comprising:
 a friction core plate including a plurality of stamped metal semi-trapezoidal members formed from a linear portion of planar stock material, each member having teeth along a common edge, said members being connected to one another by an integral deformable cord, said members being wound into a closed ring and said semi-trapezoidal members having lateral sides connected to one another; and
 a friction facing connected on said core plate.

13. A friction plate as described claim 12 wherein said facing is a full ring.

14. A friction plate as described claim 12 wherein said facing is segmented.

15. A friction plate as described claim 12 wherein said core plate has an oil hole extending therethrough.

16. A friction plate as described claim 15 wherein said facing has a groove aligned with said oil hole.

17. A method of forming an automotive transmission friction core plate comprising:
 stamping a plurality of metal semi-trapezoidal members from a linear portion of planar stock material, each member having teeth along a common edge, said members being joined to one another by an integral deformable cord; and
 winding said members into a closed ring; and
 connecting said semi-trapezoidal members to one another along their lateral sides.

18. A method as described in claim 17 further including connecting a friction facing on said core plate.

19. A method as described in claim 17 further including connecting a segmented friction facing on said core plate with segments of said friction facing overlapping a common semi-trapezoidal member of said core plate.

20. A method as described in claim 17 further including stamping oil holes in said core plate.

* * * * *

UNITED STATES PATENT AND TRADEMARK OFFICE
CERTIFICATE OF CORRECTION

PATENT NO. : 7,677,377 B2  Page 1 of 1
APPLICATION NO. : 11/543471
DATED : March 16, 2010
INVENTOR(S) : Martin P. Keating It is certified that error appears in the above-identified patent and that said Letters Patent is hereby corrected as shown below:

Column 1,
Line 56, "positioned" should be -- position --.

Column 2,
Line 32, "ends" should be -- end --.

Column 2,
Line 44, "have been stamped" should be -- that have been stamped --.

Column 3, Claim 2, "described claim" should be -- described in claim --.
Column 3, Claim 3, "described claim" should be -- described in claim --.
Column 3, Claim 4, "described claim" should be -- described in claim --.
Column 3, Claim 5, "described claim" should be -- described in claim --.
Column 3, Claim 6, "described claim" should be -- described in claim --.
Column 3, Claim 7, "described claim" should be -- described in claim --.
Column 3, Claim 8, "described claim" should be -- described in claim --.
Column 3, Claim 10, "described claim" should be -- described in claim --.
Column 3, Claim 11, "described claim" should be -- described in claim --.
Column 4, Claim 13, "described claim" should be -- described in claim --.
Column 4, Claim 14, "described claim" should be -- described in claim --.
Column 4, Claim 15, "described claim" should be -- described in claim --.
Column 4, Claim 16, "described claim" should be -- described in claim --.

Signed and Sealed this

Twenty-eighth Day of September, 2010

David J. Kappos
*Director of the United States Patent and Trademark Office*